(12) United States Patent
Hashimoto et al.

(10) Patent No.: US 6,350,103 B1
(45) Date of Patent: Feb. 26, 2002

(54) JET ENGINE BOOSTER STRUCTURE

(75) Inventors: Keisuke Hashimoto; Shinya Suga; Yusuke Sakai, all of Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/299,318

(22) Filed: Apr. 26, 1999

(30) Foreign Application Priority Data

Apr. 27, 1998 (JP) .......................................... 10-134401

(51) Int. Cl.[7] ................................................. F01D 1/02
(52) U.S. Cl. ................ 415/199.5; 415/914; 416/198 A; 416/200 A
(58) Field of Search .............................. 415/181, 199.4, 415/199.5, 191, 193, 914; 416/198 A, 200 A

(56) References Cited

U.S. PATENT DOCUMENTS

| 3,112,866 A | 12/1963 | Fortescue | 415/194 |
| 3,937,592 A | 2/1976 | Bammert | 415/194 |
| 4,859,145 A | * 8/1989 | Sidransky | 415/211.1 |

FOREIGN PATENT DOCUMENTS

| DE | 573799 | 3/1933 |
| DE | 3924829 A1 | 2/1991 |
| EP | 0 823 540 A2 | 2/1998 |
| JP | 10-54301 | 2/1998 |

* cited by examiner

*Primary Examiner*—Edward K. Look
*Assistant Examiner*—James M McAleenan
(74) *Attorney, Agent, or Firm*—Marshall, Gerstein & Borun

(57) ABSTRACT

To provide a jet engine booster structure capable of obtaining a desired pressure ratio with fewer stages. The moving blade of a booster is a boundary layer control tandem moving blade.

6 Claims, 8 Drawing Sheets

JET ENGINE BOOSTER STRUCTURE

BACKGROUND OF THE INVENTION

1. Field of the Invention

The present invention relates to the booster structure of a jet engine. More specifically, the present invention relates to a jet engine booster structure having an improved pressure ratio in a single stage.

2. Description of the Related Art

In the prior art, there has been provided a booster 2' downstream of a fan 1 in order to enhance the performance of a high bypass engine E', as shown in FIG. 11.

As shown in FIG. 11, however, the booster 2' is provided on the same shaft 3' as the fan 1 and the number of revolutions of the booster 2' is the same as that of the fan 1, whereby the circumferential speed of the moving blade 4 of the booster 2' is, therefore, limited by that of the fan 1. Due to this, the circumferential speed of the moving blade 4 is extremely lower than a desired speed, so that a pressure ratio in a single stage becomes quite low. This results in a problem that the booster 2' must consist of many stages so as to ensure a desired pressure ratio. Also, if the number of stages of the booster 2' increases, the entire length of a compressor increases, resulting in a problem that the weight of an engine E' increases. Furthermore, an increase in weight causes various problems.

SUMMARY OF THE INVENTION

The present invention has been made in view of the problems according to the prior art and has an object to provide a booster structure capable of obtaining a desired pressure ratio with fewer stages.

The jet engine booster structure according to the present invention is characterized in that a moving blade of a booster is a boundary layer control tandem moving blade.

In the jet engine booster structure according to the present invention, it is preferable that the inflow angle with a tandem moving blade lattice is within a range of 50 degrees to 70 degrees and that the efflux angle from the tandem moving blade lattice is within a range of 0 degree to 45 degrees. In addition, it is preferable that the deflection angle by a stator blade is within a range of 0 degree to 45 degrees.

Since the moving blade of the booster is the tandem moving blade in the booster structure according to the present invention, a pressure increase in a single stage is large and, therefore, a desired pressure increase can be attained with fewer stages.

Now, description will be given based on the mode of working the present invention with reference to the accompanying drawings. The present invention should, however, not be limited to the mode described herein.

DESCRIPTION OF THE PREFERRED EMBODIMENTS

Figure 1:
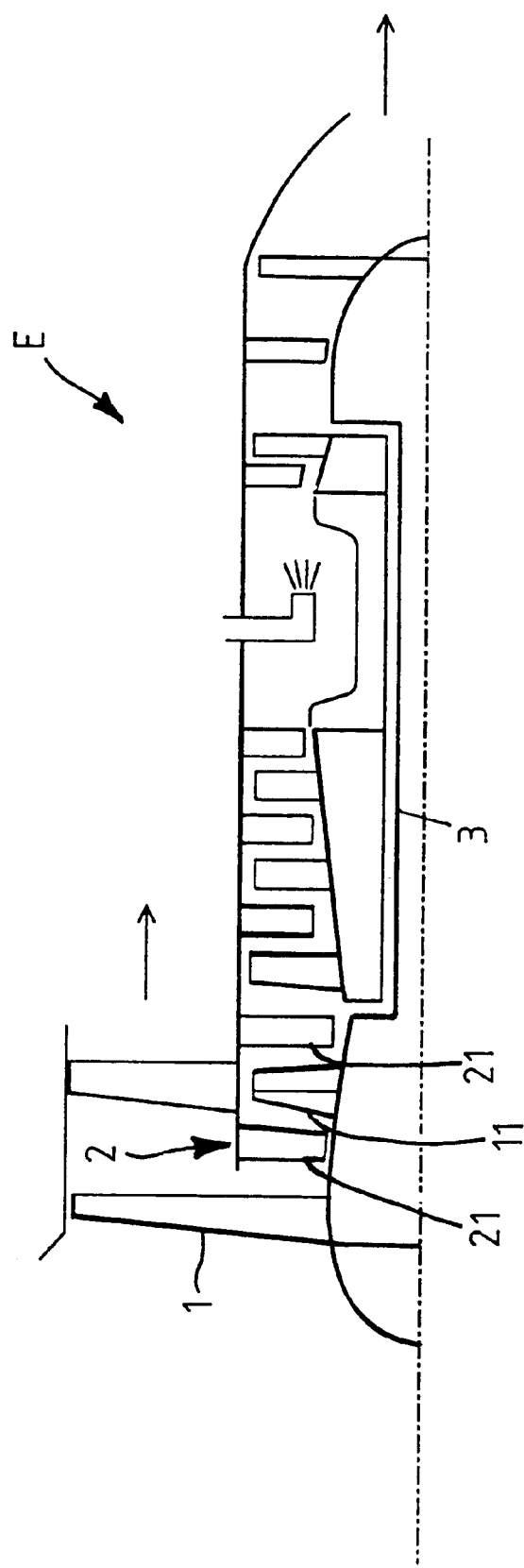
FIG. 1 is a schematic view of a turbo fan engine provided with a booster structure in one mode of an embodiment according to the present invention.
Figure 2:
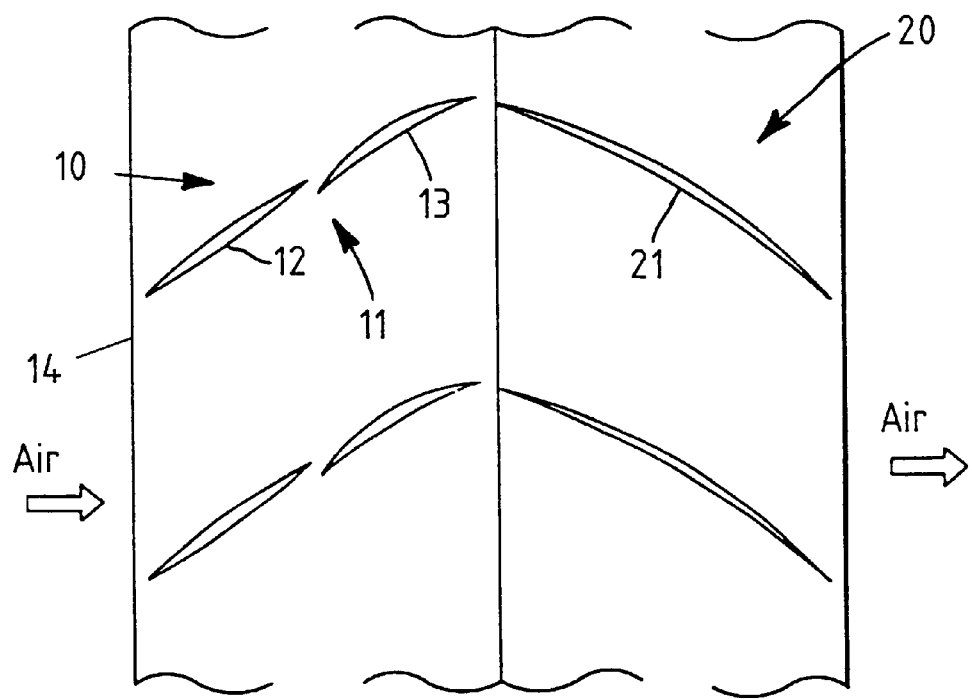
FIG. 2 is a schematic view of the important parts of the booster structure in one mode of an embodiment according to the present invention.

A turbo fan engine E having a jet engine booster structure in mode 1 of working the present invention is shown in FIG. 1 and the important parts thereof are shown in FIG. 2 schematically. In the booster structure, the moving blade of a booster 2 is a tandem moving blade 11. The tandem moving blade 11 is specifically a boundary layer control tandem moving blade 11. In other words, the moving blade lattice of this booster 2 is a tandem moving blade lattice 10.

Figure 3:
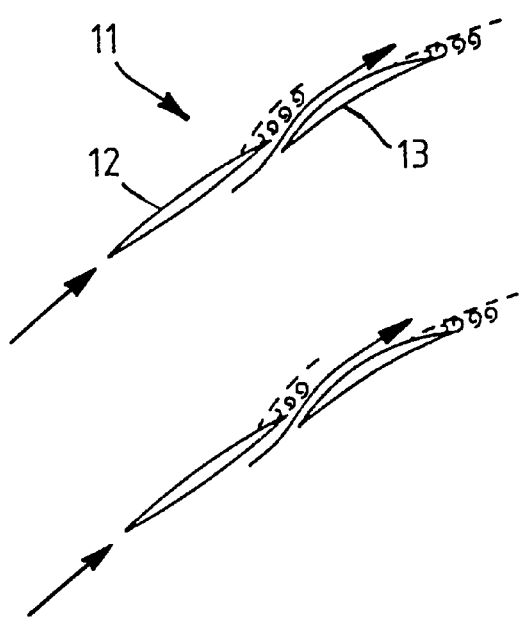
FIG. 3 is a typical view of a flow of the tandem moving blade used in the mode of an embodiment.

The shapes of the front blade 12 and rear blade 13 of the tandem moving blade 11 in this tandem moving lattice 10, the positional relationship between the front blade 12 and the rear blade 13, the positional relationship between the tandem moving blade lattice 10 and a stator blade lattice 20, pitches of the tandem moving blade lattice 10 and stator blade lattice 20 and the like are determined by performing three-dimensional calculation fluid dynamics using a computer. As for the tandem moving blade lattice 10, for instance, as typically shown in FIG. 3, the speed, momentum and the like of a jet spouted from the trailing edge of the lower surface of the front blade 12 onto the upper surface of the rear blade 13 are regulated, thereby causing the jet to flow along the upper surface of the rear blade 13. As a result, separation of a boundary layer on the upper surface of the rear blade 13 is set to be restricted to the vicinity of the trailing edge of the rear blade 13. In other words, the boundary layer of the rear blade 13 is controlled by the front blade 12. Reference symbol 3 in the figure denotes a shaft which drives the fan 1 and the booster 2, reference symbol 14 denotes a disk and reference symbol 21 denotes a stator blade.

Any program for three-dimensionally analyzing a flow around the blade lattice and the distribution of a shock wave can be used, and an application program thereof is not particularly restricted.

Figure 4:
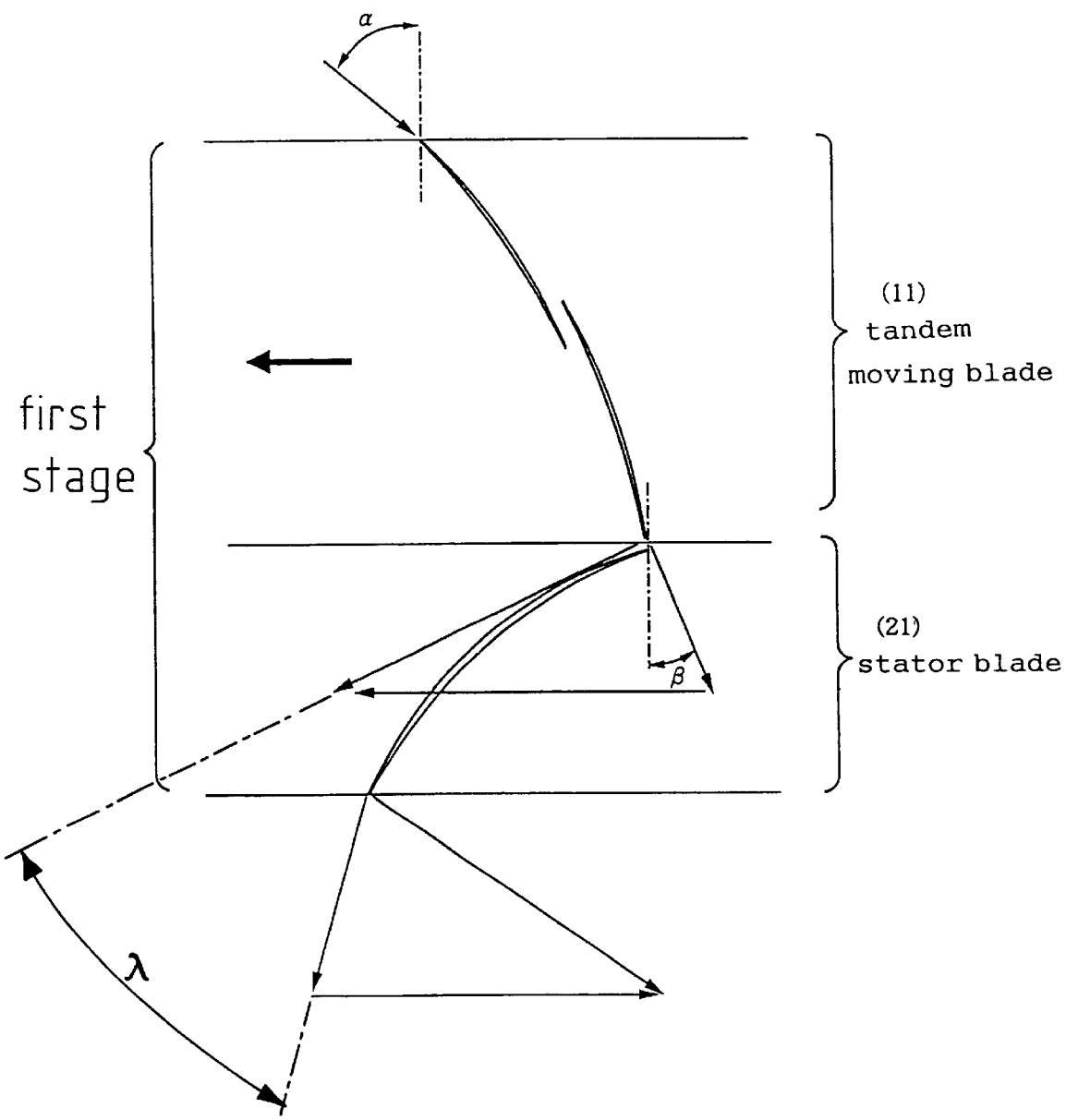
FIG. 4 is an explanatory view showing velocity triangles in a tandem moving blade lattice and a stator blade lattice used in the mode of an embodiment.
Figure 5:
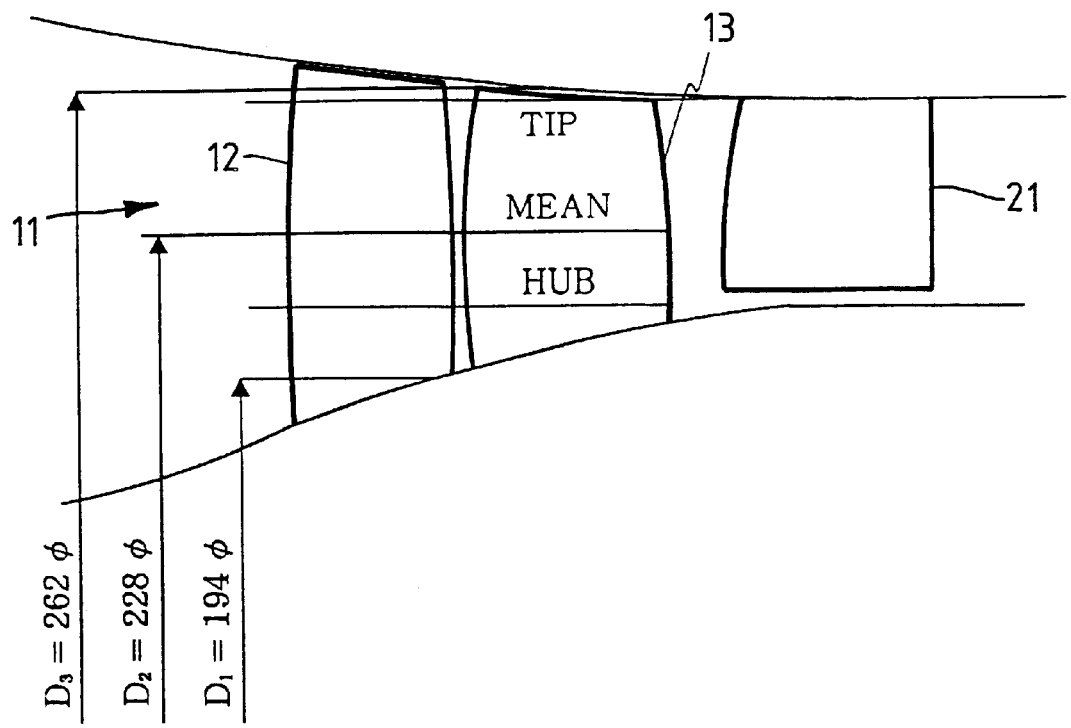
FIG. 5 is a side view of one example of the tandem moving blade lattice.
Figure 6:
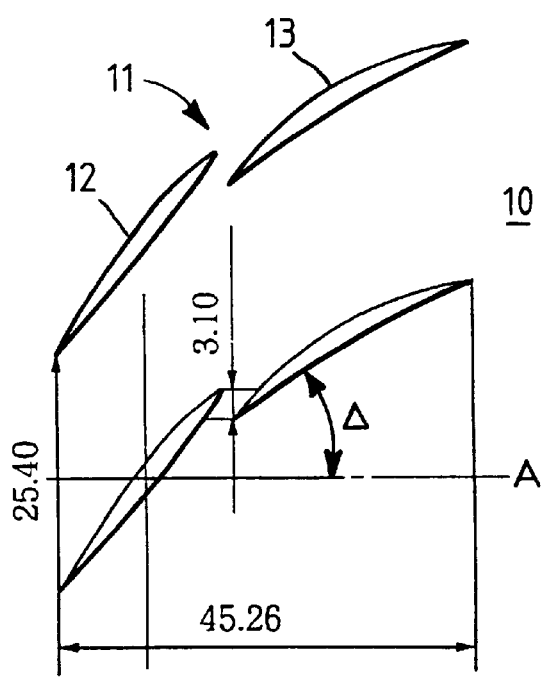
FIG. 6 is a cross-sectional view showing a HUB section of the tandem moving blade lattice in FIG. 5.
Figure 7:
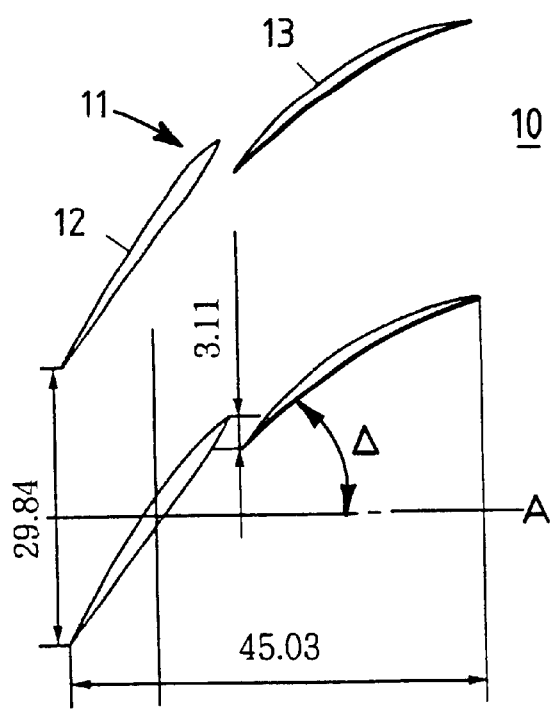
FIG. 7 is a cross-sectional view showing a MEAN section of the tandem moving blade lattice in FIG. 5.
Figure 8:
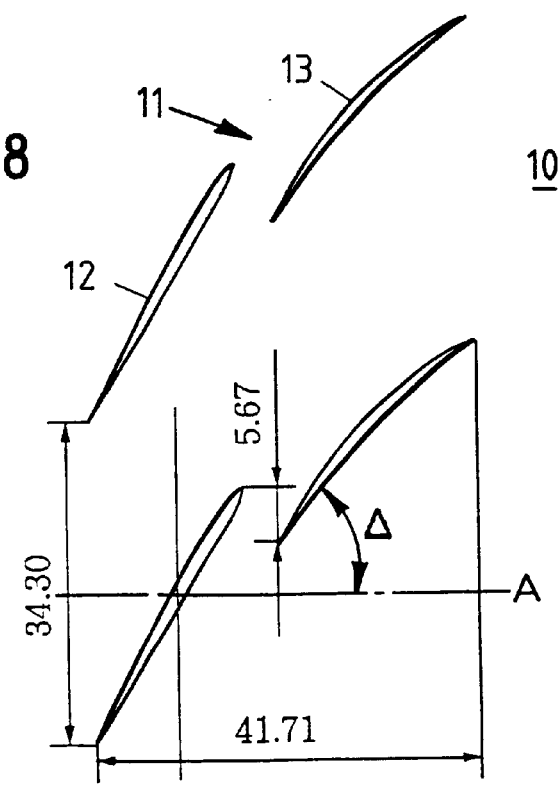
FIG. 8 is a cross-sectional view showing a TIP section of the tandem moving blade lattice shown in FIG. 5.

In addition, the shape of the stator blade lattice 20 is preferably set such that the inflow angle α (with the tandem moving blade lattice 10 shown in FIG. 4, is within a range of 50 to 70 degrees. Also, the shapes of the front blade 12 and rear blade 13 of the tandem moving blade lattice 10 are preferably set such that the efflux angle β (from the tandem moving blade lattice 10 in this case) is within a range of 0 to 45 degrees. Further, the deflection angle λ by the stator blade 21 is preferably within a range of 0 to 45 degrees.

Thus, the tandem moving blade lattice 10 having the above characteristics can be obtained by setting the positional relationship between the front blade 12 and the rear blade 13 of the tandem moving blade 11 and that of the tandems 12 and 13 or, for instance, the dimensional relationship between the front blade 12 and the rear blade 13 as shown in FIGS. 5 through 8, by changing the mutual relationship between the front blade 12 and the rear blade 13 from a state in which the front blade 12 and the rear blade 13 are laid down together from an HUB section to a TIP section (that is, the angle Δ of the HUB to axis A is small, to a state in which they rise together (that is, the angle Δ of the TIP to axis A is large), and by gradually increasing the gap between the front blade 12 and the rear blade 13. In other words, if the front blade 12 and the rear blade 13 are twisted together, the tandem moving blade lattice 10 having the above characteristics can be obtained.

As stated above, in this mode of an embodiment, the tandem moving blade lattice 10 is used for the moving blade of the booster 2 and a pressure ratio in a single stage is, therefore, high. Thus, the number of stages of the booster 2 can be reduced, with the result that the dimensions of a compression mechanism structure can be decreased and the weight thereof can be reduced, as well.

It is noted that the tandem moving blade 11 having a characteristic that the boundary layer of the rear blade 13 is controlled by the front blade 12 is defined as "boundary layer control tandem moving blade" in the present specification.

Now, the present invention will be described more specifically based on a more specific embodiment.

Embodiment and Comparative Example

Figure 9:
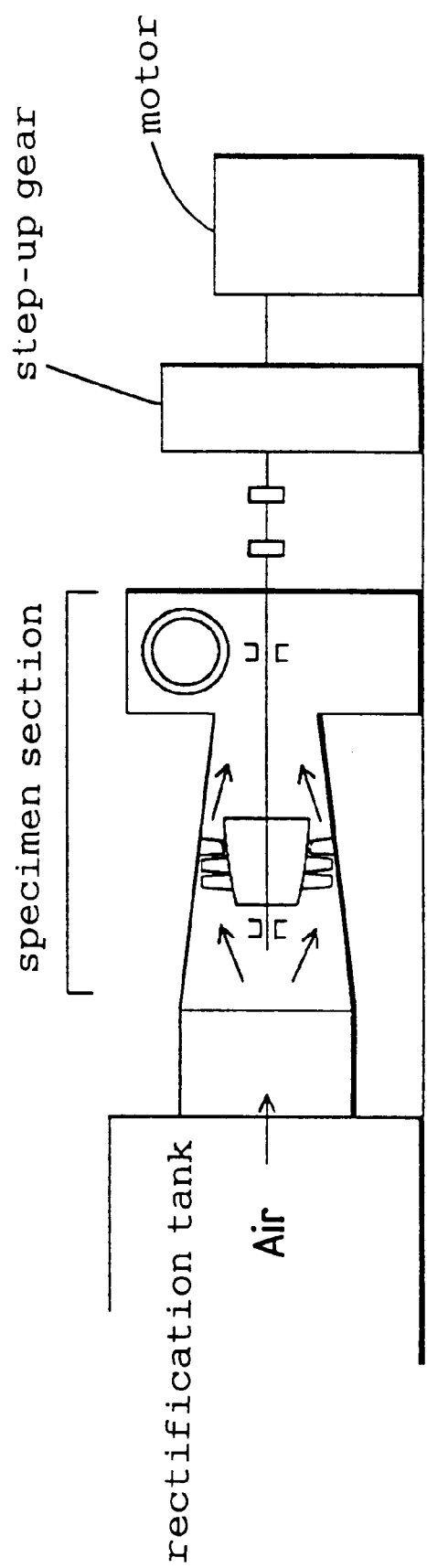
FIG. 9 is a schematic view of a testing device used for a performance test of the embodiment and a comparative example.

A boundary layer control tandem moving blade lattice (embodiment) having principle items shown in Table 1 was fabricated with a shape of and a dimension shown in FIGS. 5 through 8, in which a tandem moving blade lattice served as a booster. The performance of this booster was measured by a testing device shown in FIG. 9. In addition, a conventional blade lattice (comparative example) having principle items shown in Table 2 was fabricated with the same width as that of the tandem moving blade according to the embodiment, and the performance thereof was measured by the same testing device in the embodiment.

Figure 10:
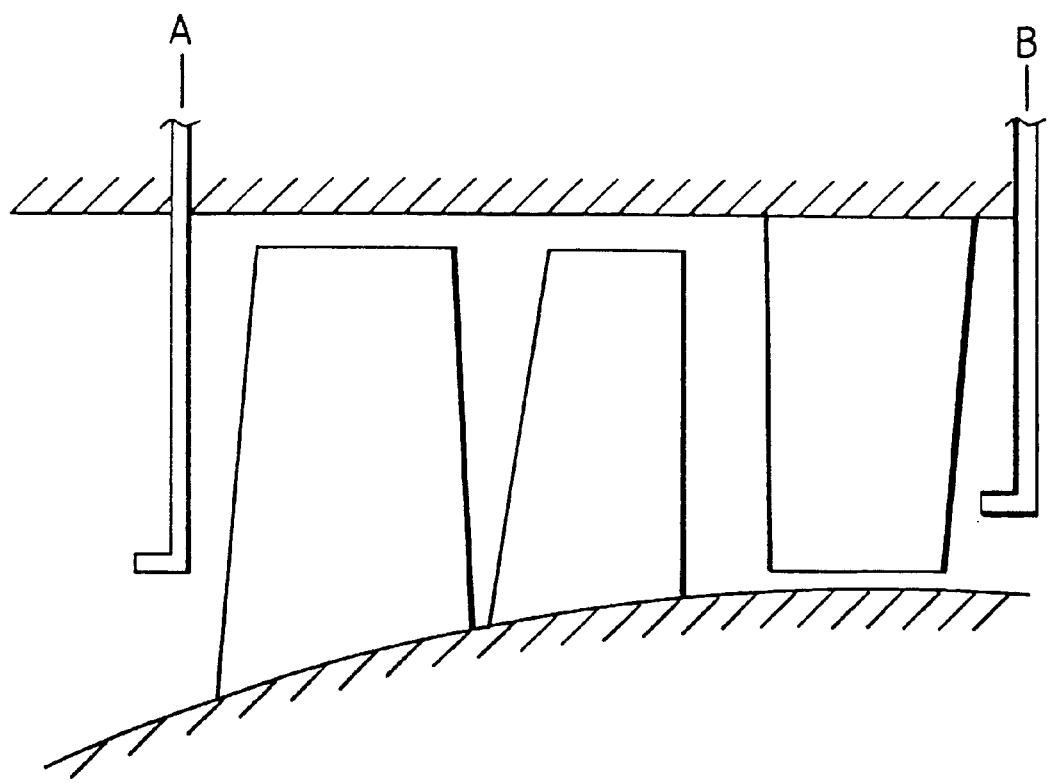
FIG. 10 is an explanatory view showing a measurement method in the testing device shown in FIG. 9.
Figure 11:
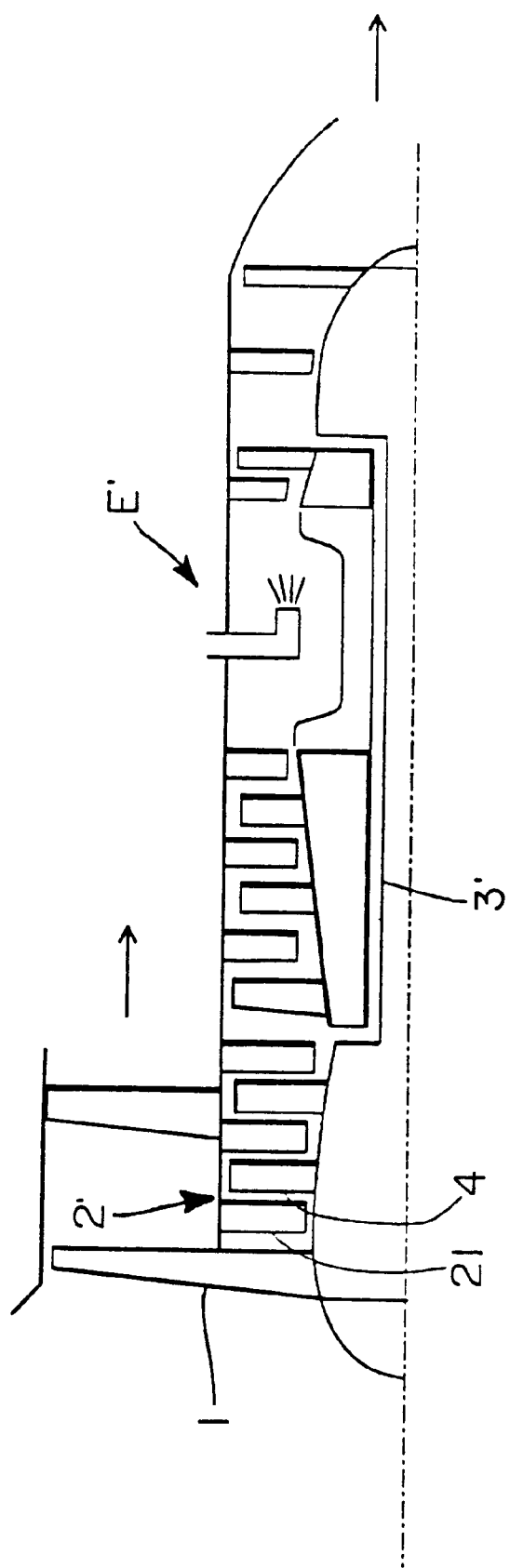
FIG. 11 is a schematic view of a prior art turbo fan engine provided with a conventional booster structure.

As typically shown in FIG. 10, measurement was performed by disposing a total pressure measuring probe and a total temperature measuring probe in front and rear portions of the blade (points A and B in FIG. 10) respectively, and radially traversing the probes every millimeter between TIP and HUB section. A flow rate was measured by an orifice provided in the upstream of an inlet duct section. The number of revolutions of the blade lattice was measured by a revolution measuring pick-up provided on a rotation shaft of a disk to which the blade lattice is attached.

The data obtained by the measurement was processed in the following manner.

(1) Each of the average measured values of a total pressure and a total temperature between the TIP and HUB sections on the portions A and B is calculated.

(2) A pressure ratio is calculated based on a ratio PB/PA of an average value PB of the total pressure on the point B to an average value PA of the total pressure on the point A.

(3) An average value TB of the total temperature on the point B and an average value TA of the total temperature on the point A are also calculated, and the average value PB of the total pressure on the point B and the average value PA of the total pressure on the point A which have been calculated are also used to obtain an efficiency by the following equation.

$$\eta = TA\{(PB/PA)^{(k-1)/k} - 1\}/(TB-TA)$$

where η is Adiabatic efficiency and k is an Adiabatic exponent.

Table 1 shows the result of measurement in the embodiment, and the pressure ratio, pressure increase and the adiabatic efficiency thus calculated together with principle items of the embodiment. Table 2 shows a result of measurement, the pressure ratio, the pressure increase and the efficiency in the comparative example.

TABLE 1

| Embodiment | Principle Item | Measured value |
|---|---|---|
| Number of blades | Front blade 24 Rear blade 24 | — |
| Diameter of blade tip (mm) | 265 | — |
| Number of revolutions (rpm) | 16023 | 16000 |
| Flow rate (kg/s) | — | 3.25 |
| Pressure ratio | — | 1.3 |
| Pressure increase | — | 0.3 |
| Adiabatic Efficiency (%) | — | 87 |

TABLE 2

| Comparative Example | Principle Item | Measured value |
|---|---|---|
| Number of blades | 24 | — |
| Diameter of blade tip (mm) | 265 | — |
| Number of revolutions (rpm) | 16023 | 16000 |
| Flow rate (kg/s) | — | 3.25 |
| Pressure ratio | — | 1.15 |
| Pressure increase | — | 0.15 |
| Adiabatic efficiency (%) | — | 86.5 |

It is apparent from a comparison between Table 1 and Table 2 that a high pressure increase of 0.3 which is about 2.0 times as high as that of the comparative example can be obtained in the embodiment of the present invention while keeping the same efficiency as in the comparative example.

Although the present invention has fully been described based on one mode of working the invention and an embodiment, it is to be understood that the present invention should not be limited thereto and various changes and modifications are possible. For instance, while the tandem moving blade lattice has a single stage in the mode of working the invention as well as the embodiment, the number of stages can be two or three in accordance with a required pressure ratio.

As staged so far in detail, in the booster structure of the present invention, the booster moving blade is a tandem moving blade. Due to this, the structure has excellent advantages in that a pressure increase in a single stage is larger and that a desired pressure increase can be attained with fewer stages. Besides, since the booster is allowed to have fewer stages, the present invention exhibits excellent advantages in that the entire length of the compressor can become smaller and the weight thereof can be reduced.

What is claimed is:

1. A jet engine booster structure comprising:
   one or more stages wherein each stage has a plurality of rows, each row including:
   a single stator blade; and
   a moving blade, said moving blade comprising a boundary layer control tandem moving blade.

2. The jet engine booster structure according to claim 1, wherein an inflow angle with a tandem moving blade lattice is within a range of 50 degrees to 70 degrees.

3. The jet engine booster structure according to claim 1, wherein an efflux angle from a tandem moving blade lattice is within a range of 0 degree to 45 degrees.

4. The jet engine booster structure according to claim 1, wherein a deflection angle by the stator blade is within a range of 0 degree to 45 degrees.

5. The jet engine booster structure according to claim 1, wherein the jet engine booster structure is part of a jet engine.

6. A jet engine including a booster structure comprising:
   one or more stages wherein each stage has a plurality of rows, each row including:
   a single stator blade; and
   a moving blade, said moving blade comprising a boundary layer control tandem moving blade,
   wherein an inflow angle with a tandem moving blade lattice is within a range of 50 degrees to 70 degrees, an efflux angle from said tandem moving blade lattice is within a range of 0 degree to 45 degrees and a deflection angle by said stator blade is within a range of 0 degree to 45 degrees.

* * * * *

UNITED STATES PATENT AND TRADEMARK OFFICE
CERTIFICATE OF CORRECTION

PATENT NO.    : 6,350,103 B1
DATED         : February 26, 2002
INVENTOR(S)   : Hashimoto et al.

It is certified that error appears in the above-identified patent and that said Letters Patent is hereby corrected as shown below:

Column 5,
Lines 3-4, insert -- axial --, after "a plurality of", and before "rows".
Line 4, insert -- axial --, after "rows, each", and before "row".
Line 6, insert -- tandem --, after "a" first occurrence, and before "movi ng blade".
Line 6, insert -- tandem --, after "blade, said", and before "moving blade comprising".

Column 6,
Lines 5-6, insert -- axial --, after "a plurality of", and before "rows".
Line 6, insert -- axial --, after "rows, each", and before "rows".
Line 8, insert -- tandem --, after "a" first occurrence, and before "moving blade".
Line 8, insert -- tandem --, after "blade, said", and before "moving blade comprising".

Signed and Sealed this

Twenty-fifth Day of June, 2002

Attest:

Attesting Officer

JAMES E. ROGAN
*Director of the United States Patent and Trademark Office*